Figure 1:
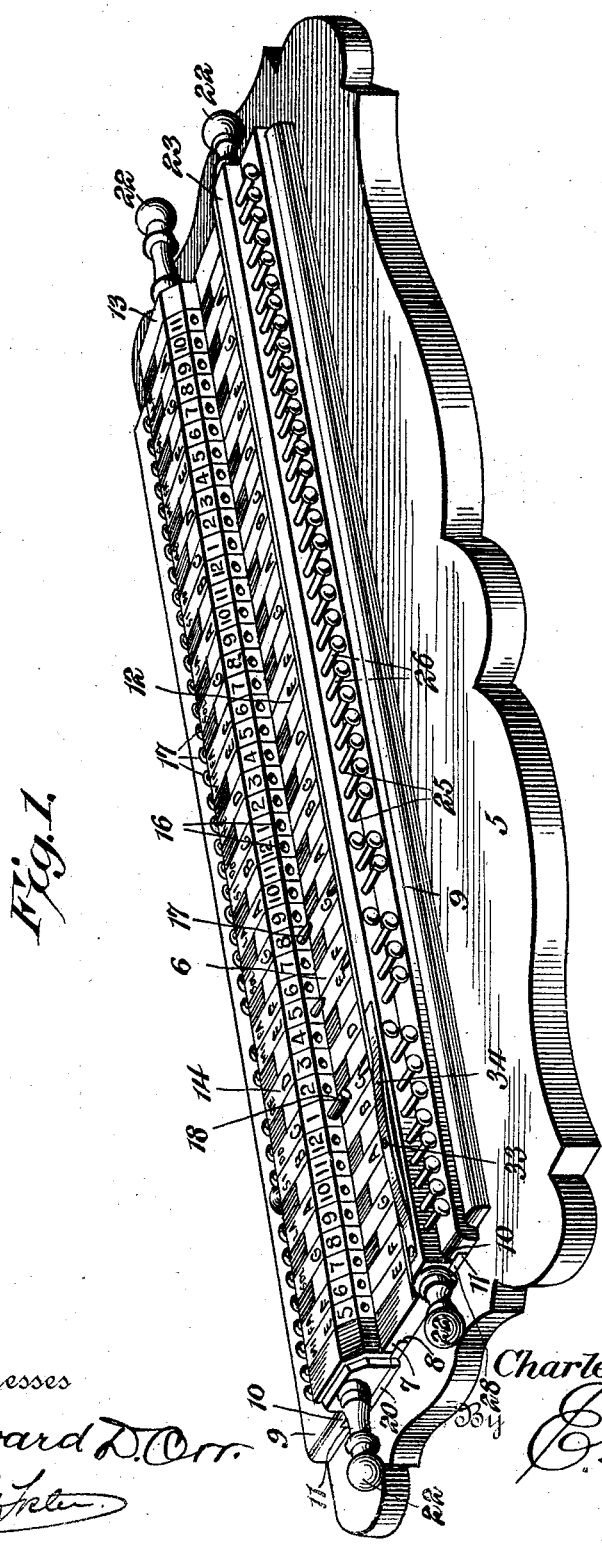

C. E. POMEROY.
DEVICE FOR ASSISTING IN TEACHING AND WRITING MUSIC.
APPLICATION FILED NOV. 19, 1907.

900,201.

Patented Oct. 6, 1908.

2 SHEETS—SHEET 1.

Witnesses
Howard D. Orr.

Inventor,
Charles E. Pomeroy,
By
Attorney

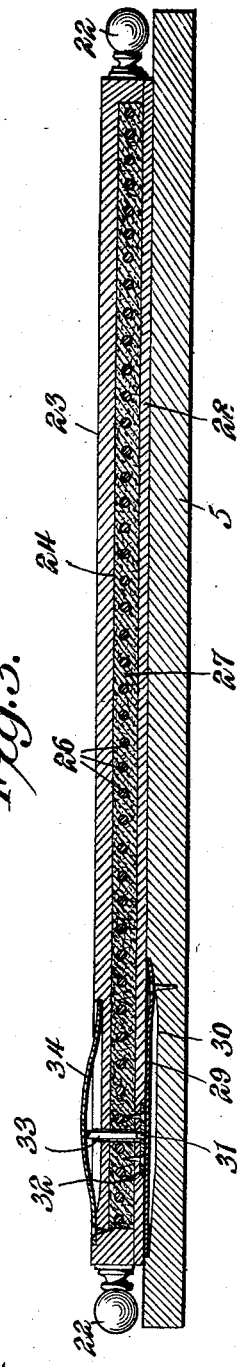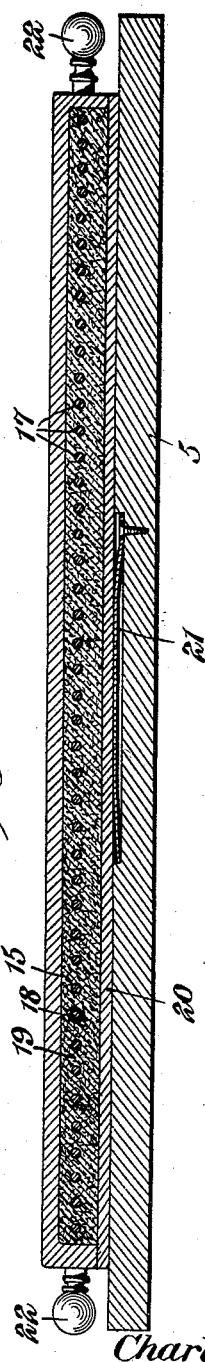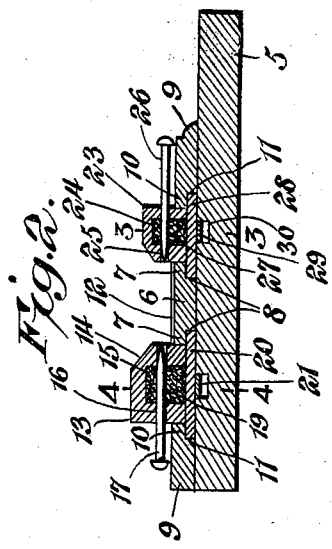

UNITED STATES PATENT OFFICE.

CHARLES ENOS POMEROY, OF SALT LAKE CITY, UTAH.

DEVICE FOR ASSISTING IN TEACHING AND WRITING MUSIC.

No. 900,201.  Specification of Letters Patent.  Patented Oct. 6, 1908.

Application filed November 19, 1907. Serial No. 402,864.

*To all whom it may concern:*

Be it known that I, CHARLES E. POMEROY, a citizen of the United States, residing at Salt Lake City, in the county of Salt Lake and State of Utah, have invented a new and useful Device for Assisting in Teaching and Writing Music, of which the following is a specification.

One of the principal objects of the present invention is to provide means that will constitute an aid in writing musical compositions by visibly showing any and all intervals and chords, as well as illustrating the practicability of effecting chord successions, according to the rules of harmony, either in one common mode, or from one mode to another.

Another and important object is to provide an appliance for quickly and readily analyzing musical compositions, according to the rules of harmony, as may be done on a piano key-board, forming in effect a miniature or dummy piano at such times and places where a real instrument might be objectionable or unavailable. It is particularly useful in this way because the study of harmony is usually pursued on the piano or organ key-board.

A third object is to provide an instrument that will aid pupils in the study of harmony,—as distinguished from an aid to the performance of music, vocal or instrumental, which aid is ordinarily placed on a key-board as a guide to striking the chords.

An embodiment of the invention that is at present considered the preferable one is illustrated in the accompanying drawings, wherein:—

Figure 1 is a perspective view of the instrument. Fig. 2 is a cross sectional view therethrough. Fig. 3 is a longitudinal sectional view on the line 3—3 of Fig. 2. Fig. 4 is a longitudinal sectional view on the line 4—4 of Fig. 2.

Similar reference numerals designate corresponding parts in all the figures of the drawings.

In the embodiment illustrated, a base 5 is employed preferably having a flat upper face, and of artistic configuration. A central strip 6 is secured longitudinally upon the base, and has its side margins 7 cut away and overhanging the base in spaced relation thereto, forming guideways 8. Other strips 9, secured to the base in parallel and spaced relation to the strip 6, have their inner margins cut away and overhanging the base, as shown at 10, thus forming thereon guideways 11. Mounted on the central strip is a scale 12 indicative of successive musical tones, forming in effect an immovable gamut. Preferably, though not necessarily, this scale represents the key-board of a piano or organ, showing the black and white keys, the normal scale tones being indicated by capital letters.

A support, in the form of a slide block 13, is slidably mounted in the rear set of guideways 8—11, and its upper or outer face is marked off into divisions, resembling a piano key-board and corresponding to those of the base scale 12. This slide scale is designated as a whole by the reference numeral 14. The scale illustrates forty-three chromatic tones, extending upward from E in the "small octave", to B flat in the "thrice-marked octave", covering a range of three and one-half octaves. The tones of the normal scale (C) are indicated by capital letters engraved thereon, C, D, E, F, G, A, B, (and repeat) along the full range of the scale. The syllables of the "tonic-sol-fa" system are engraved over the normal scale tone designations, as shown. The numerical positions of the twelve tones in each octave, are indicated by Arabic figures on each tone division. While the tones on the scales are marked off in black and white divisions, after the manner of piano keys, this is not absolutely necessary, as the tones indicate the gamut of forty-three chromatic tones, regardless of any instrumental adaptation. Still it is an advantage to pupils or musicians, who are pianists to have them so marked, and in fact to such people it obviates the necessity of engraving the tone names on the keys.

The slide bar or block 13 is provided with a longitudinal recess 15 opening through its under side, and a plurality of transverse guideways 16 intersect this recess. A set of separately movable pointers, in the form of headed pins 17 are slidably mounted in the guideways 16 and pass through the recess 15. Each pointer is associated with one of the tone indicators, and its inner end is slidable into and out of associated relation with the scale 12 of the base. There is also employed a pointer 18 different from the others and associated with the "lower C". This is employed as a marker for the "tonic fundamental tone", and may be termed the "Do mark". As already stated, the pointers pass through the recess and this recess is filled with compressible friction material 19, such as felt, which engages the pointers, and serves to prevent their accidental displacement or movement. The open side of the recess is closed by a strip 20 secured to the under side of the slide block, and projecting beyond the side edges thereof, said strip engaging in the guideways 8 and 11. Suitable friction springs, one of which is shown at 21 in Fig. 4, are secured to the base and engage the under side of the slide to hold it against accidental movement. The slide furthermore is preferably provided at its ends with projecting knobs 22, whereby it may be conveniently operated. On the opposite side of the base scale 12 is located another support or slide block 23, having a longitudinal recess 24 and transverse guideways 25. Pointers in the form of headed pins 26 operate in the guideways and are frictionally held against accidental movement and detachment by a cushion 27 of felt or other material located in the recess. This recess is closed by a strip 28 secured to the under side of the slide or support and having its margins engaging in the other set of guideways 8 and 11. The pointers of this slide are movable into and out of associated relation with the scale 12 of the base. The slide, is however, normally locked against movement, and to this end, a spring 29, shown in Fig. 3, is secured in a socket 30 in the base, and has an upstanding pin 31 that engages in an opening in a plate 32 secured to the under side of the strip 28. The spring latch thus produced can be disengaged from the slide by a spring supported stem 33 that passes downwardly through the slide and is movable into engagement with the stud or pin 31 to disengage it from the plate. The pin 33 is supported by a leaf spring 34, and is bowed, as shown, and is carried on the top of the slide 23.

In connection with this structure, the various standard chords as named in *Standard Harmony Methods* may be expressed by the number of the tones in the chromatic scale, as follows:

| | | | | | |
|---|---|---|---|---|---|
| 1. Tonic major | 1 | 5 | 8 | | |
| 2. Tonic minor | 1 | 4 | 8 | | |
| 3. Dominant seventh | 8 | 12 | 3 | 6 | |
| 4. Key of the dominant | 8 | 12 | 3 | | |
| (Dom. 7th. of same) | 3 | 7 | 10 | 1 | |
| 5. Sub-dominant major | 6 | 10 | 1 | | |
| (Dom. 7th. of same) | 1 | 5 | 8 | 11 | |
| 6. Sub-dominant minor | 6 | 9 | 1 | | |
| (Dom. 7th. of same.) (Same as No. 5.) | | | | | |
| 7. Tonic relative minor | 10 | 1 | 5 | | |
| (Dom. 7th. of same) | 5 | 9 | 12 | 3 | |
| 8. Relative major | 4 | 8 | 11 | | |
| (Dom. 7th. of same) | 11 | 3 | 6 | 9 | |
| 9. Dominant relative minor | 5 | 8 | 12 | | |
| (Dom. 7th. of same) | 12 | 4 | 7 | 10 | |
| 10. Sub-dominant relative minor | 3 | 6 | 10 | | |
| (Dom. 7th. of same) | 10 | 2 | 5 | 8 | |
| 11. Mediant | 5 | 9 | 12 | | |
| (Dom. 7th. of same.) (Same as No. 9.) | | | | | |
| 12. Dim. 7th. on leading tone of dominant | 7 | 10 | 1 | 4 | |
| 13. Dim. 7th. on leading tone of tonic | 12 | 3 | 6 | 9 | |
| 14. Dim. 7th. on leading tone of sub-dom | 5 | 8 | 11 | 2 | |
| 15. Augmented 5th.—4 groups | 1 | 5 | 9 | | |
| 16. Added sixth | 3 | 6 | 10 | 1 | |
| 17. Neapolitan 6th. 4 forms, (Form 1) | 12 | 2 | 6 | 9 | |
| " " (Form 2) | 8 | 12 | 2 | 6 | |
| " " (Form 3) | 2 | 6 | 12 | 6 | |
| " " (Form 4) | 6 | 6 | 9 | 2 | |
| 18. Italian sixth | 9 | 1 | 7 | 1 | |
| 19. French sixth | 3 | 7 | 9 | 1 | |
| 20. German sixth | 7 | 9 | 1 | 4 | |
| 21. Dominant ninth major | 8 | 12 | 3 | 6 | 10 |
| 22. Dominant ninth minor | 8 | 12 | 3 | 6 | 9 |
| 23. Dominant 11th, 3 forms, (Form 1) | 1 | 8 | 3 | 6 | |
| " " (Form 2) | 1 | 8 | 12 | 6 | |
| " " (Form 3) | 1 | 12 | 3 | 6 | |
| 24. Dominant 13th. major | 1 | 8 | 12 | 3 | 6 10 |
| 25. Dominant 13th. minor | 1 | 8 | 12 | 3 | 6 9 |

This structure may be employed for three general purposes, first, as an aid in writing musical compositions by visibly showing any and all intervals and chords and the practicability of effecting chord successions according to the rules of harmony, second, as a quick and ready appliance for analyzing musical compositions, according to the rules of harmony, and third, as an aid to pupils in the study of harmony and to composers in the harmonization of compositions. With this structure by moving the pointers of the slide scale into associated relation with the base scale to indicate a particular chord, when the "Do mark" is at lower C, the same can be readily transposed by sliding the support until the "Do mark" registers with other keys while the lower set of indicators can be employed to indicate the original positions from which the upper set has been moved.

The following may be given as examples of the use of the device. For instance C to E is a major third. If the same is indicated by moving the pointers on the upper support into associated relation with the lower scale, by sliding said support so that the "Do mark" 18 will point to other keys, than the key of C on the scale 12, the interval of a major third will be shown in the scale of any desired key. For example, if the "Do mark" with the pointers set as above described, is moved to F, the interval from F to A is indicated as a major third. All the other intervals may be similarly indicated and transposed to all keys. Chord successions within the same mode, for example from C to A minor, may be indicated by using both sets of pointers. Chord successions from one mode to another, for example, from the tonic major chord of C to the tonic major chord of D flat, may be indicated by using both sets of pointers. For the purpose of analyzing musical compositions, if an accord is found in a composition, such accord may be analyzed by indicating it with the lower set of pointers. In this instance, said pointers are used in connection with the upper scale. Thus if the "Do mark" is on C and the pointers of the lower set are moved to indicate 1, 5, 8 and 11 on the upper scale, by reference to the table of standard chords above set forth, it will be found that the dominant 7th. of the sub-dominant major F is indicated. All other standard named chords as formulated in the said table may be identified by moving the "Do mark" to various keys and searching the table for the particular formulas indicated. The table of standard chords is also useful in connection with the device as a ready reference for arranging music, because of the full list of standard chords formulated therein, which may be readily indicated upon the instrument in any desired key. For example to indicate the diminished 7th. on leading tone of the dominant, say in the key of C, the "Do mark" is placed so that it will point to C on the lower scale and the pointers of the upper slide are set to the formula of 7-10-1-4. By moving the "Do mark" to any desired key, the tone of the foregoing chord will be indicated by the pointers on the upper slide, which will point to the specified tones on the lower scale.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In an instrument of the character set forth, the combination with a base, of a scale thereon indicative of successive musical tones, a reciprocatory slide mounted on the base alongside the scale and having a corresponding scale, and a plurality of indicators slidably mounted on the slide and disposed transversely thereof, said indicators being associated with the scale of the slide and being independently movable into and out of associated relation with the scale of the base.

2. In an instrument of the character set forth, the combination with a base, of a scale thereon indicative of successive musical tones, a reciprocatory slide mounted on the base alongside the scale and movable longitudinally thereof, a scale carried by the slide, and a plurality of reciprocatory indicating pins slidably mounted on the slide and disposed transversely thereof, said pins being associated with the scale of the slide and being separately movable into and out of associated relation with the scale of the base.

3. In an instrument of the character set forth, the combination with a base having a scale thereon indicative of successive musical tones, of a reciprocatory slide mounted on the base and movable to different positions longitudinally thereof, and a plurality of separate reciprocatory pointers mounted on the slide and independently slidable thereon into and out of associated relation with the scale of the base, said pointers being movable with the slide.

4. In an instrument of the character set forth, the combination with a base having a scale indicative of successive musical tones, of a support, and a plurality of separate pointers slidably mounted on the support and movable thereon into and out of association with the scale.

5. In an instrument of the character set forth, the combination with a scale of tone designations, of a support located adjacent to the scale and having a recess therein, a plurality of indicators slidably mounted on the support, and friction means located in the recess and engaging the indicators to hold them against accidental displacement.

6. In an instrument of the character set forth, the combination with a base, of a scale of tone designations mounted on the base, and an elongated supporting block mounted on the base and having a longitudinal recess in its under side, said block also having transversely disposed guideways that intersect the recess, indicating pointers slidably mounted in the guideways and movable into and out of associated relation with the scale, and compressible material located in the recess of the supporting block and frictionally engaging the pointers to hold them against accidental displacement.

7. In an instrument of the character set forth, the combination with a base, of a strip secured to the base and having a margin overhanging the same, forming a guideway, a scale of tone designations on the strip, a slide block having a recess in its under side and transversely disposed guideways that intersect the recess, indicating pointers slidably mounted in the guideways, compressible material in the recess and frictionally engaging the pointers, and a strip secured to the under side of the block and closing the recess, said strip having a projecting margin engaged in the guideway formed by the base and strip margin.

8. In an instrument of the character set forth, the combination with a base, of a scale of tone designations carried thereby, a slidable support mounted on the base, a set of indicators movably mounted on the support and movable thereon into and out of associated relation with the scale, and another set of indicators also movable into and out of associated relation with the scale.

9. In an instrument of the character set forth, the combination with a base, of a scale of tone designations carried thereby, a support slidably mounted on the base on one side of the scale, a corresponding scale mounted on the support, pointers slidably mounted on the support and movable into and out of associated relation with the scale of the base at one side of the same, and another set of slidable pointers mounted on the base and movable into and out of associated relation with the opposite side of the base scale.

10. In an instrument of the character set forth, the combination with a base having a scale of tone designations thereon, of a plurality of separately movable slides located on opposite sides of the scale, a corresponding scale carried by one of the slides, a plurality of independently movable pointers associated with the slide scale and movable on the slide thereof into and out of associated relation with the scale of the base, and a plurality of independently movable pointers mounted on the other slide and movable into and out of coöperative relation with the scale of the base.

11. In an instrument of the character set forth, the combination with a base, of a strip secured longitudinally thereon and having overhanging margins, forming guideways, a scale indicative of successive musical tones located on the outer face of the strip, other strips secured to the base in spaced relation to the first mentioned strip and having overhanging margins forming guideways, separately movable reciprocatory slides operating in the guideways and located on opposite sides of the base scale, said slides having recesses in their under sides with transversely disposed guideways that intersect the recesses, strips secured to the under sides of the slides and closing the recesses, said strips projecting beyond the side edges of the slide and engaging in the guideways formed by the strips of the base, a latch for securing one of the slides against movement, friction means engaging the other slide to prevent its accidental movement, a scale corresponding to the base scale mounted on one of the slides, a plurality of pointers slidably mounted in the guideways of the different slides and movable into and out of associated relation with the scale of the base, and friction material located in the recesses of the slides and engaging the pointers to prevent their accidental displacement.

In testimony, that I claim the foregoing as my own, I have hereto affixed my signature in the presence of two witnesses.

CHARLES ENOS POMEROY.

Witnesses:
J. FLETCHER, Jr.,
E. W. ENOS.